(12) United States Patent
Li

(10) Patent No.: US 6,410,161 B1
(45) Date of Patent: Jun. 25, 2002

(54) METAL-CERAMIC JOINT ASSEMBLY

(75) Inventor: Jian Li, New Milford, CT (US)

(73) Assignee: FuelCell Energy, Inc., Danbury, CT (US)

(*) Notice: Subject to any disclaimer, the term of this patent is extended or adjusted under 35 U.S.C. 154(b) by 0 days.

(21) Appl. No.: 09/292,440

(22) Filed: Apr. 15, 1999

(51) Int. Cl.$^7$ .............................................. B21D 39/00
(52) U.S. Cl. ..................... 428/621; 428/57; 428/681; 428/685; 228/122.1; 228/903
(58) Field of Search ................... 428/680, 672, 428/681, 685, 469, 472, 621; 228/903, 122.1

(56) References Cited

U.S. PATENT DOCUMENTS

| | | | |
|---|---|---|---|
| 4,722,630 A | * 2/1988 | Fang | 403/30 |
| 5,042,847 A | * 8/1991 | Lasecki et al. | 285/138 |
| 5,083,884 A | * 1/1992 | Miller et al. | 403/404 |
| 5,250,845 A | * 10/1993 | Runyan | 257/729 |
| 5,519,191 A | * 5/1996 | Ketcham et al. | 219/552 |

OTHER PUBLICATIONS

Allen G. Gray, Metal Progress/Data Book 1978, American Society for Metals, vol. 114, No. 1, Jun. 1978, pp. 71 and 217.*

* cited by examiner

*Primary Examiner*—Deborah Jones
*Assistant Examiner*—Andrew T Piziali
(74) *Attorney, Agent, or Firm*—Robin, Blecker & Daley

(57) ABSTRACT

A metal-ceramic joint assembly in which a brazing alloy is situated between metallic and ceramic members. The metallic member is either an aluminum-containing stainless steel, a high chromium-content ferritic stainless steel or an iron nickel alloy with a corrosion protection coating. The brazing alloy, in turn, is either an Au-based or Ni-based alloy with a brazing temperature in the range of 9500 to 1200° C.

22 Claims, 1 Drawing Sheet

METAL-CERAMIC JOINT ASSEMBLY

STATEMENT REGARDING FEDERALLY SPONSORED RESEARCH OR DEVELOPMENT

This invention was made with Government support under Contract No. DE-FC 21-95MC31184 awarded by the U.S. Department of Energy. The Government has certain rights in the invention.

BACKGROUND OF THE INVENTION

This invention relates to a joint assembly for joining members comprised of different materials and, in particular, to a joint assembly for joining metallic and ceramic members.

Ceramic members may be joined to metallic members using specialized brazing processes. During a brazing process, the ceramic member, metallic member and brazing filler alloy are all subjected to a temperature at the melting point of the brazing filler alloy. A sufficient time at the brazing temperature is allowed for the brazing filler alloy to melt and flow, thereby wetting the surfaces of both the ceramic and the metallic members, which have been properly conditioned for the brazing process.

The resulting brazed assembly is then cooled below the solidification temperature of the brazing material. The ceramic and metallic members, therefore, become joined physically and chemically to form a ceramic and metallic joint assembly via the solidified brazing material.

For electrical or heat isolation, metal-ceramic brazed joint assemblies are widely used. Applications of these joint assemblies can be found in vacuum systems, gas turbine engines, automobile power units, nuclear reactors and electrochemical systems such as fuel cells. For low temperature applications, such as in vacuum systems, metal-ceramic thermal mismatch is not significant, so that the process is relatively straightforward. However, for high temperature applications, such as in engines and high temperature fuel cells, especially in corrosive environments, special considerations are required to overcome the thermal mismatch and corrosion effects.

Fuel cells are electrochemical devices which convert the chemical energy of reaction efficiently into electricity. Usually, the fuel and oxidant gases are fed continuously through the inlet gas pipelines. The reacted gases exit the fuel cells through the outlet gas pipelines. Both the inlet and outlet gas pipelines are required to be electrically isolated from the fuel cell stacks. In high temperature fuel cells, such as carbonate fuel cells (operating at ~650° C.) and solid oxide fuel cells (operating at ~800–1000° C.), the electrical isolation is typically provided by ceramic breaks consisting of metal-ceramic pipe joints. The best commercially available ceramic break for this purpose is Kovar (Fe—Ni alloy)-$Al_2O_3$ pipe brazed by Ag-based filler metal. This typical break can be used in the carbonate fuel cell environment for a certain period of time without integrity and gas leakage degradation.

Various corrosive environments are encountered in high temperature fuel cells. In the carbonate fuel cell, for example, the fuel gas is a high temperature gas mixture of $H_2$, $N_2$, $H_2O$, CO and $CO_2$, and the oxidant gas is a high temperature gas mixture of $O_2$, $N_2$, $H_2O$ and $CO_2$. Carbonate vapors are also present. These atmospheres require metallic materials with a high corrosion resistance. For the solid oxide fuel cell, the temperature is even higher (~1000° C.), and the corrosion attack is severer.

Currently there are no commercially available ceramic breaks that can meet the requirements of sufficient corrosion/oxidation resistance and high temperature strength (650–1000° C.) for long-term high temperature applications, and well developed techniques to manufacture the desired products.

It is, therefore, an object of the present invention to provide an improved metal-ceramic joint assembly.

It is a further object of the present invention to provide a metal-ceramic joint assembly having high temperature and corrosion endurance over extended periods of time.

It is yet a further object of the present invention to provide a metal-ceramic joint assembly capable of withstanding the environment of high temperature fuel cells, such as carbonate and solid oxide fuel cells, over extended periods of fuel cell operation.

SUMMARY OF THE INVENTION

In accordance with the principles of the present invention, the above and other objects are realized in a metal-ceramic joint assembly comprising a ceramic member, a preselected metallic member spaced from the ceramic member and a preselected brazing alloy situated therebetween. More particularly, the metallic member is selected from one or more of an aluminum containing ferritic stainless steel, a high chromium-content ferritic stainless steel and an iron-nickel alloy with a corrosion protection coating. The brazing alloy, in turn, is selected from one or more of an Au-based and Ni-based alloy having a brazing temperature in the range of 950 to 1200° C.

In further accord with the invention, the metallic and ceramic members are physically configured so that the metallic member has a conical outwardly tapered sleeve section and the ceramic member has a conical inwardly tapered region which faces and is spaced from conical sleeve of the metallic member. This space receives the brazing alloy. The conical sleeve section and conical region have the same taper which is at an angle in the range of greater than 15 degrees to less than 45 degrees relative to the sleeve axis.

Also, in accord with the invention, the conical sleeve section is provided with a nickel plating of a thickness of 10 μm or greater and the conical region with a metallization coating. Additionally, in accord with the invention, a brazing process with preselected parameters is provided.

DESCRIPTION OF THE DRAWINGS

The above and other features and aspects of the present invention will become more apparent upon reading the following detailed description in conjunction with the accompanying drawings in which.

DETAILED DESCRIPTION

Figure 1:
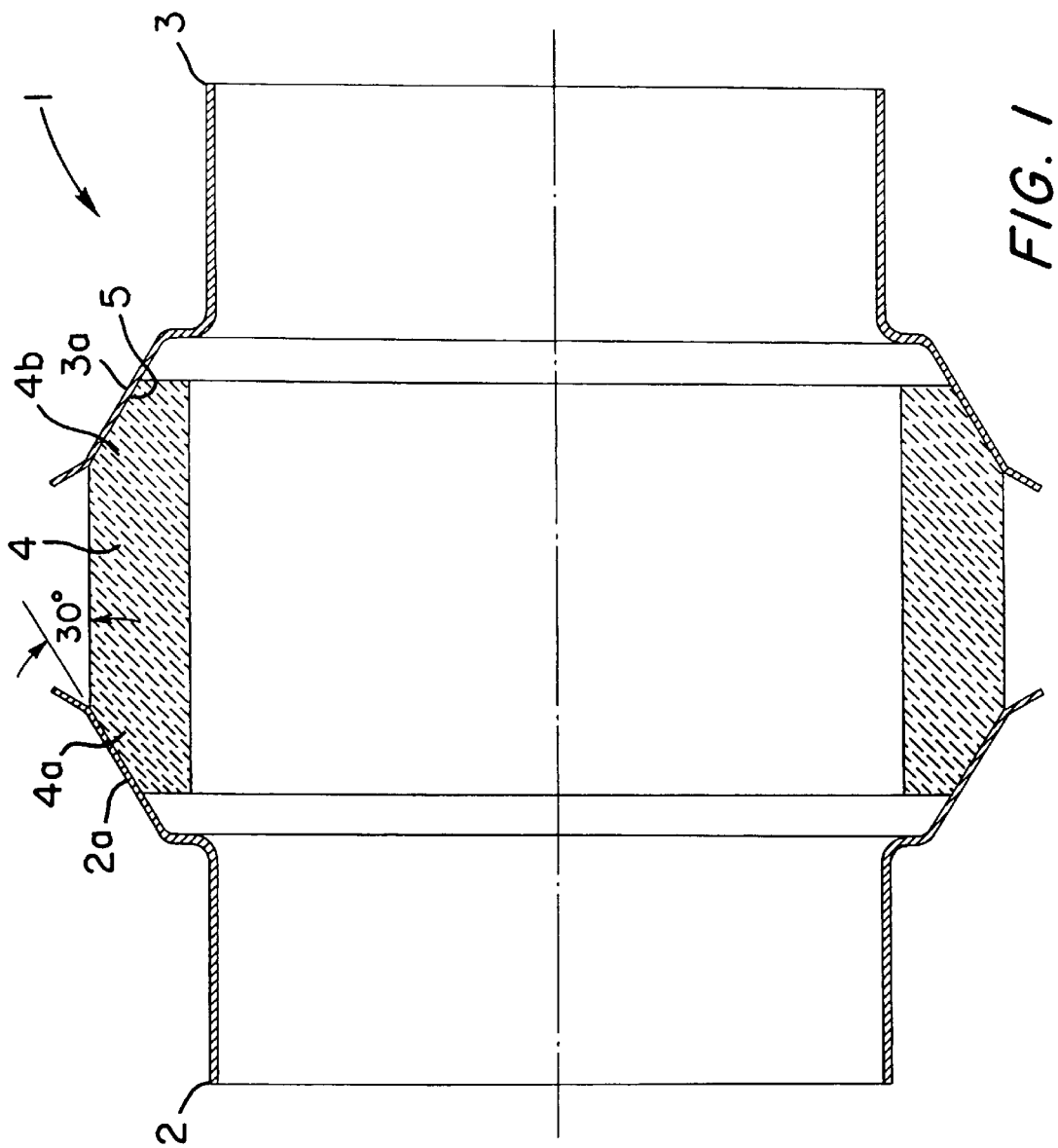
FIG. 1 shows a metal-ceramic joint assembly in accordance with the principles of the present invention.

In FIG. 1, a metal-ceramic joint assembly 1 in accordance with the principles of the invention is illustrated. The joint assembly 1 comprises a first metallic member 2 and a second or further metallic member 3 having conical outwardly tapered sleeve sections 2a and 3a. A ceramic member 4 is fit within and between the metallic members. The ceramic member includes like conical inwardly tapered regions 4a and 4b which face and are spaced from the respective conical sleeve sections 2a and 3a.

Situated in the space between the sleeves 2a and 3a and the regions 4a and 4b is a brazing alloy 5. The alloy 5 joins the sleeves and the regions to complete the joint assembly 1.

In accordance with the principles of the present invention, the metallic members 2 and 3, ceramic member 4 and brazing alloy 5 are selected such that the metal-ceramic joint is compatible with and exhibits endurance in the corrosive and high temperature environment of fuel cells, such as, for example, carbonate and solid oxide fuel cells. To this end, the metallic members 2 and 3 are selected to minimize thermal mismatch and to provide corrosion resistance and high temperature strength. The brazing material, in turn, is selected to have sufficient ductility to release thermal stresses caused by the difference in the coefficient of thermal expansion of the metallic and ceramic members. Finally, the mechanical configuration of the joint assembly, i.e., the tapering of the conical sleeve sections of the metallic members 2 and 3 and the conical regions of the ceramic member 4, is such as to ensure adequate clearance space for the brazing alloy and to help counter the detrimental effects of any thermal mismatch.

More particularly, in accord with the invention, each of the metallic members 2 and 3 can comprise an Al-containing ferritic stainless steel, such as 18SR (a composition containing 18% Cr, 1% Si, 2% Al and the balance Fe), Kanthal and Fecralloy alloys (alloys sold under the names Kanthal and Fecralloy are composed of 22–24 Cr % wt, 4–6 Al % wt and the balance Fe) and Hoskins alloys. Also, in accord with the invention, each metallic member can comprise a high Cr-content ferritic stainless steel (as used herein the term high Cr-content stainless steel means a stainless steel with a chromium content of about 18% or higher), such as 446 (446 is the name of a ferritic stainless steel which has a Cr content of 23–27% and also contains 0.20% C, 1.5% Mn, 1.0% Si, 0.040% P, 0.030% S, 0.25% N and the remainder Fe). These types of alloys possess a thermal expansion coefficient of 6.5 in/in ° F. (70 to 2000° F.), which is ~30% lower than austenitic stainless steels. Also, the alloys basically contain Fe, Cr and Al, and have been shown to have a significantly higher corrosion resistance than 18-8 type austenitic stainless steels in high temperature environments.

In further accord with the invention, another material which can be used for the metallic members 2 and 3 is Kovar (a Fe—Ni alloy containing 29% Ni, 17% Co and the balance Fe) which has an average coefficient of temperature expansion (6.8 in/in. ° F.) comparable to the above mentioned ferritic alloys in the temperature range between room temperature and brazing temperature. However, when this material is used, it must be provided with corrosion protection. This can be effected by thermal spray coatings such as AL, MAl, $M_3Al$, MCrAlY(M:Fe or Ni) or ceramics $AL_2O_3$, $ZrO_2$. These coatings compensate for the fact that Kovar contains no Cr and is not itself sufficiently corrosion resistant at high temperature.

As above-mentioned, ductility and corrosion resistance are required of the brazing alloy. In accordance with the invention, preferable brazing alloys are BAu-4 (BVAu-4) (the latter alloys are gold compositions containing 81.5 to 82.5% Au with about 0.011–0.015% other elements and the balance Ni), an Au—Ni solid solution, and BNi-5 (NICROBRAZ-30, Ni—Cr based)(BNi-5 is a composition containing 18.5–19.5% Cr, 0.03% B, 9.75–10.50% Si, 0.10% or less of each of C, P, S, Al, Ti and Zr, and the balance Ni). BAu-4 has been used to braze a wide range of high temperature iron and nickel-base alloys where a greater resistance to oxidation or corrosion is required and where ductility plays an important role during service. BNi-5 has been employed extensively in joining and repairing aerospace engine components due to its excellent high temperature oxidation resistance. Other than these two alloys other Au-based and Ni-based (NICROBRAZ®) alloys with brazing temperature in the range of 950 to 1200° C. can be used. These brazing alloys have not heretofore been used in joining metallic and ceramic materials.

The ceramic member 4 can be any of a number of ceramic materials. Alumina is one material. However, other ceramics such as mullite, Sialons and other structure oxide ceramics with comparable thermal, mechanical and dielectric properties can be used.

As discussed previously, one of the concerns in the joint assembly 1 formed by the ceramic and metallic members 2, 3 and 4 and the brazing alloy 5, is thermal mismatch between the ceramic and metallic materials. This mismatch gives rise to two major effects. The first is difficulty in maintaining a proper joint clearance. The second is causing stresses on the brittle ceramic material which has strong compressive strength, but a much weaker tensile strength.

Proper joint clearance provides adequate capillary forces to retain the molten brazing material in between the two mating parts. Minimizing tensile stresses prevents cracking of the ceramic component.

To provide adequate clearance and prevent cracking, the aforementioned mating tapered conical sleeve sections 2a and 2b of the metallic members and the tapered conical regions 4a and 4b of the ceramic member are used. This design provides a self-alignment mechanism, derived by gravity, maintaining a concentrically symmetric relative position and exact clearance between the two mating components. A taper angle of 30° relative to the axial direction of the conical sleeves has been used, but taper angles in the range of greater than 15 to less than 45° can also be used.

To improve the brazing process, the metallic members 2 and 3 are electroplated with Ni to enhance their surface wettability. For the ferritic stainless steels mentioned above, Al and Cr will diffuse outward into the plated Ni during heating and be oxidized before the brazing alloy is melted, even in vacuum or controlled atmosphere, since the oxygen partial pressure for oxidizing Al and Cr is extremely low. Surface oxidation will dramatically reduce the surface wettability. Accordingly, in accordance with the invention, a plated Ni thickness of 10 $\mu$m or thicker is used on the metallic member surfaces to avoid surface discoloration (oxidation) at a brazing temperature in the range of 950 to 1200° C.

For wettability, the tapered conical regions 4a and 4b of the ceramic member 4 can also be metallized. High temperature compatible pre-metallization or active metallization, such as Mo—Mn process or refractory metal hydride powder metallization can be used.

In the brazing process, the ceramic/brazing alloy/metal assembly is placed in a vacuum furnace at $10^{-4}$ to $10^{-6}$ torr or a furnace with a controlled atmosphere. The furnace temperature is gradually increased to above the melting point of the brazing alloy, at which a sufficient period of time is held to obtain a uniform distribution of the brazing alloy into the gap between the ceramic and metal components. During cooling, a slow cooling rate (preferably slower than 2° C./min) is selected to avoid a quick dimension change of the components, and allow diffusion between the brazing alloy and the substrates. Diffusion inside the joint is believed to enhance the bonding strength and improve the ductility of the braze.

Joint assemblies have been successfully fabricated using this process and the materials of the invention. Thermal cyclic tests (up to 10 thermal cycles) have demonstrated no degradation of joint integrity and gas leakage.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A metal-ceramic joint assembly comprising:
    a metallic member formed from one of an aluminum-containing stainless steel, a high chromium-content ferritic stainless steel and an iron-nickel alloy with a corrosion protection coating, said metallic member including a conical outwardly tapered sleeve section;
    a ceramic member spaced from said metallic member, said ceramic member including a conical inwardly tapered region situated within said conical outwardly tapered sleeve section of said metallic member, the region between said conical outwardly tapered sleeve section of said metallic member and the conical inwardly tapered region of said ceramic member defining a space; and
    a brazing alloy situated in said space, said brazing alloy being one of a Au-based and Ni-based alloy and having a brazing temperature in the range of 950 to 1200° C.

2. A metallic-ceramic joint assembly in accordance with claim 1 wherein:
    said aluminum containing ferritic stainless steel is one of 18 SR and an alloy containing 22–24 Cr % wt, 4–6 Al % wt and the balance Fe;
    said high chromium content ferritic stainless steel is 446;
    said iron-nickel alloy is a material having a composition of 29% Ni, 17% Co and the balance Fe with a corrosion protection coating;
    said ceramic is one of alumina, mullite and Sialons;
    said brazing alloy is one of BAu-4 (BVAu-4) and Bni-5.

3. A metal-ceramic joint assembly in accordance with claim 2 wherein:
    said corrosion protection coating is one or more of Al, FeAl, NiAl, $Fe_3Al$, $Ni_3Al$, FeCrAlY, NiCrAlY, $Al_2O_3$ and $ZrO_2$.

4. A metal-ceramic joint assembly in accordance with claim 2 wherein:
    said metallic member is plated with a coating for enhancing surface wettability.

5. A metal-ceramic joint assembly in accordance with claim 4 wherein:
    said coating comprises nickel and has a thickness equal to or greater than about 10 $\mu$m.

6. A metal-ceramic joint assembly in accordance with claim 5 wherein:
    said ceramic member is coated with a metal.

7. A metal-ceramic joint assembly in accordance with claim 5 wherein:
    the tapers of said conical outwardly tapered sleeve section and said conical inwardly tapered region are each at the same angle relative to a line parallel to the axis of said conical outwardly tapered section.

8. A metal-ceramic joint assembly in accordance with claim 7 wherein:
    said angle is in a range of greater than 15 to less than 45 degrees.

9. A metal-ceramic joint assembly in accordance with claim 5 wherein:
    said metal-ceramic joint assembly comprises a further metallic member spaced from said ceramic member to define a further space;
    said brazing alloy is situated in said further space;
    said further metallic member includes a conical outwardly tapered sleeve section facing the outwardly tapered conical sleeve section of said metallic member;
    said ceramic member includes a further conical inwardly tapered region situated within the conical outwardly tapered sleeve section of said further metallic member, the region between said conical outwardly tapered sleeve section of said further metallic member and the further conical outwardly tapered section of said ceramic member defining said further space occupied by said brazing alloy.

10. A metal-ceramic joint assembly in accordance with claim 9 wherein:
    the tapers of said conical outwardly tapered sleeve sections and said conical inwardly tapered regions are at the same angle relative to the axis of said conical outwardly tapered sleeve sections, said angle being an angle in the range of greater than 15 to less than 45°.

11. A metal-ceramic joint assembly in accordance with claim 1 wherein:
    said metallic member is plated with a coating for enhancing surface wettability.

12. A metal-ceramic joint assembly in accordance with claim 11 wherein:
    said coating comprises nickel and has a thickness equal to or greater than about 10 $\mu$m.

13. A metal-ceramic joint assembly in accordance with claim 1 wherein:
    the tapers of said conical outwardly tapered sleeve section and said conical inwardly tapered region are each at the same angle relative to a line parallel to the axis of said conical outwardly tapered sleeve section.

14. A metal-ceramic joint assembly in accordance with claim 13 wherein:
    said angle is in a range of greater than 15 to less than 45 degrees.

15. A metal-ceramic joint assembly in accordance with claim 1 wherein:
    said metal-ceramic joint assembly comprises a further metallic member;
    said further metallic member includes a conical outwardly tapered sleeve section facing the outwardly tapered conical sleeve section of said metallic member,
    said ceramic member includes a further conical inwardly tapered region situated within the conical outwardly tapered sleeve section of said further metallic member, the region between said conical outwardly tapered sleeve section of said further metallic member and the further conical outwardly tapered section of said ceramic member defining a further space occupied by said brazing alloy.

16. A metal-ceramic joint assembly in accordance with claim 15 wherein:
    the tapers of said conical outwardly tapered sleeve sections and said conical inwardly tapered regions are at the same angle relative to the axis of said conical outwardly tapered sleeve sections, said angle being an angle in the range of greater than 15 to less than 45°.

17. A metal-ceramic joint assembly in accordance with claim 1 wherein:
    said aluminum containing ferritic stainless steel is one of 18 SR and an alloy containing 22–24 Cr % wt, 4–6 Al % wt and the balance Fe.

18. A metal-ceramic joint assembly in accordance with claim 1 wherein:

said high-chromium content stainless steel is 446.

19. A metal-ceramic joint assembly in accordance with claim 1 wherein:

said ceramic is one of alumina, mullite and Sialons.

20. A metal-ceramic joint assembly in accordance with claim 1 wherein:

said brazing alloy is one of BAu-4 (BVAu-4) and BNi-5.

21. A metallic-ceramic joint assembly in accordance with claim 1 wherein:

said iron-nickel alloy is a material having a composition of 29% Ni, 17% Co and the balance Fe with a corrosion protection coating.

22. A metal-ceramic joint assembly in accordance with claim 21 wherein:

said corrosion protection coating is one or more of Al, FeAl, NiAl, $Fe_3Al$, $Ni_3Al$, FeCrAlY, NiCrAlY, $Al_2O_3$ and $ZrO_2$.

* * * * *

UNITED STATES PATENT AND TRADEMARK OFFICE
CERTIFICATE OF CORRECTION

PATENT NO.     : 6,410,161 B1
DATED          : June 25, 2002
INVENTOR(S)    : Jian Li It is certified that error appears in the above-identified patent and that said Letters Patent is hereby corrected as shown below:

Title page,
Item [57], ABSTRACT,
Line 7, delete "9500" and insert -- 950º --.

Column 3,
Line 33, delete "6.5" and insert -- ~6.5 --.

Signed and Sealed this

Eleventh Day of March, 2003

JAMES E. ROGAN
*Director of the United States Patent and Trademark Office*